US008672291B2

(12) United States Patent
Tyler

(10) Patent No.: US 8,672,291 B2
(45) Date of Patent: Mar. 18, 2014

(54) INTEGRATED SENSOR FOR POSITION CONTOL

(75) Inventor: Jeff Tyler, Newark, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 666 days.

(21) Appl. No.: 12/988,835

(22) PCT Filed: May 13, 2009

(86) PCT No.: PCT/US2009/043693
§ 371 (c)(1),
(2), (4) Date: Oct. 21, 2010

(87) PCT Pub. No.: WO2009/140322
PCT Pub. Date: Nov. 19, 2009

(65) Prior Publication Data
US 2011/0043308 A1  Feb. 24, 2011

Related U.S. Application Data

(60) Provisional application No. 61/056,209, filed on May 27, 2008, provisional application No. 61/053,715, filed on May 16, 2008.

(51) Int. Cl.
*F16K 31/02* (2006.01)
(52) U.S. Cl.
USPC ............. 251/129.04; 251/129.15; 251/129.07
(58) Field of Classification Search
USPC ............ 251/129.04, 129.15, 129.07; 137/554
See application file for complete search history.

(56) References Cited

U.S. PATENT DOCUMENTS

| 4,628,499 A | 12/1986 | Hammett |
| 4,725,039 A * | 2/1988 | Kolchinsky .............. 251/129.08 |
| 5,211,019 A | 5/1993 | Bauer |
| 5,520,217 A | 5/1996 | Grawunde |
| 6,883,320 B2 | 4/2005 | Tyler |
| 2002/0070370 A1* | 6/2002 | Fukano et al. ........... 251/129.04 |
| 2007/0257087 A1 | 11/2007 | Klinstein et al. |

FOREIGN PATENT DOCUMENTS

| EP | 0813006 | 12/1997 |
| WO | 91/01236 | 2/1991 |

OTHER PUBLICATIONS

PCT Search Report; PCT/US2009/043693; Dec. 22, 2009, 11 pages.

* cited by examiner

*Primary Examiner* — John K Fristoe, Jr.
*Assistant Examiner* — Kevin E Lynn
(74) *Attorney, Agent, or Firm* — Brown & Michaels, PC

(57) ABSTRACT

An actuator control system including a servo-actuator comprising: at least one coil; a solenoid core within the at least one coil; a rod within the solenoid core having a first end, a second end, and a length extending between the first end and the second end, the first end coupled to a sensing core pin having a profile; a moveable member coupled to the second end of the rod; a moveable armature within the solenoid core surrounding a portion of the length of the rod and biased by a spring; and a noncontact sensor integral with servo-actuator and aligned with the first end of the rod coupled to the sensing core pin. A selected position of the servo-valve actuator may be set by the ECU by sensing the position of the sensing core pin using the non-contact sensor.

9 Claims, 6 Drawing Sheets

US 8,672,291 B2

INTEGRATED SENSOR FOR POSITION CONTOL

REFERENCE TO RELATED APPLICATIONS

This application claims one or more inventions which were disclosed in Provisional Application No. 61/053,715, filed May 16, 2008, entitled "INTEGRATED SENSOR FOR POSITION CONTROL" and Provisional Application No. 61/056,209, filed May 27, 2008, entitled "INTEGRATED SENSOR FOR POSITION CONTROL". The benefit under 35 USC §119(e) of the United States provisional applications are hereby claimed, and the aforementioned applications are hereby incorporated herein by reference.

BACKGROUND OF THE INVENTION

1. Field of the Invention

The invention pertains to the field of actuator control valve systems. More particularly, the invention pertains to an integrated sensor for position control in an actuator control valve system.

2. Description of Related Art

Prior art servo actuation systems require that a sensor be mounted separately from the servo control valve, creating additional leak paths and complexity to the assembly. In addition, because the sensors are mounted in different locations, they are not directly coupled to the moving member of the system, reducing the accuracy of the servo actuation systems.

The present invention integrates the sensor into the assembly, reducing the costs, eliminating the additional leak paths, and providing more accurate position sensing of the moving member directly.

SUMMARY OF THE INVENTION

An actuator control system including a servo-actuator comprising: at least one coil; a solenoid core within the at least one coil; a rod within the solenoid core having a first end, a second end, and a length extending between the first end and the second end, the first end coupled to a sensing core pin having a profile; a moveable member coupled to the second end of the rod; a moveable armature within the solenoid core surrounding a portion of the length of the rod and biased by a spring; and a noncontact sensor integral with servo-actuator and aligned with the first end of the rod coupled to the sensing core pin. A selected position of the servo-valve actuator may be set by the ECU by sensing the position of the sensing core pin using the non-contact sensor.

DETAILED DESCRIPTION OF THE INVENTION

Figure 1:
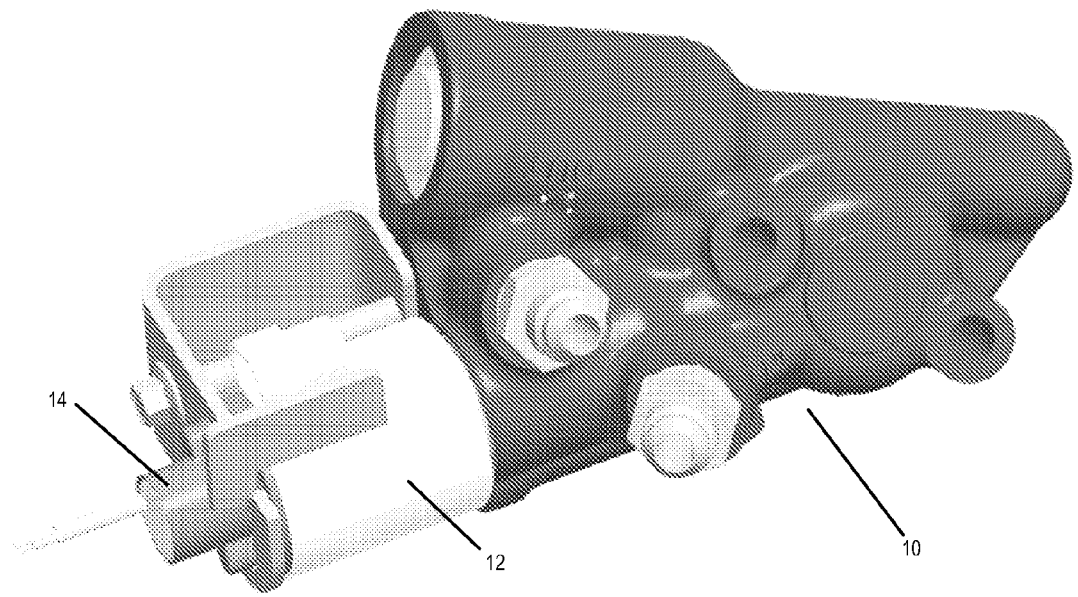
FIG. 1 shows a view of an actuator control valve system in a first embodiment of the present invention.
Figure 2:
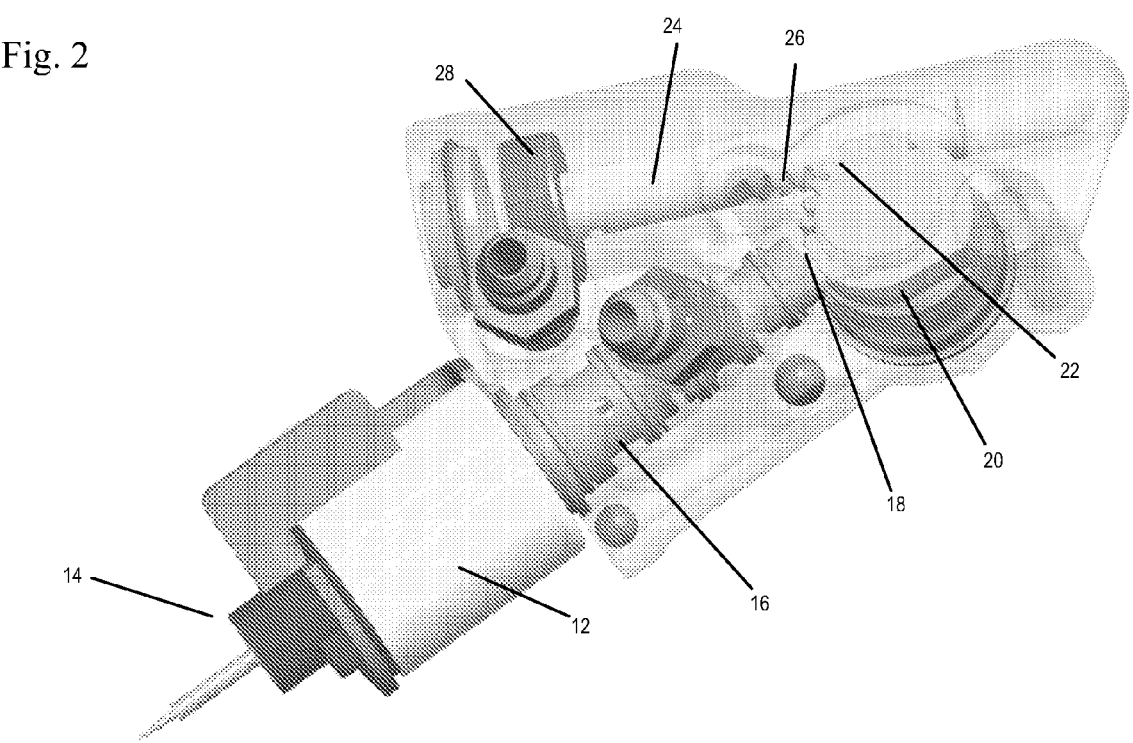
FIG. 2 shows an alternate view of the actuator control valve system shown in FIG. 1.

FIGS. 1-4 show an actuator control valve system in a first embodiment of the present invention. The actuator valve control system 10 includes a servo-actuator 12 with a servo-valve body 16 and an integrated sensor 14.

The servo-actuator 12 includes a servo-valve body 16 and a solenoid core 33 surrounded by coil(s) 38. The solenoid core 33 includes a null spring 34 and a spring retainer 35, an adjustable spring retainer 80 and a movable armature 32. An air gap 41 is present between the armature 32 and the solenoid core 33. The servo-actuator 12 also has a sensing rod 30 with a first rod end 30a with a sensing core pin 36 and a second rod end 30b connectable to a movable member 18. The sensing core pin 36 is sensed by a non-contact sensor 14 built into or integral with an end of the servo-actuator 12. The non-contact sensor 14 reports the position of the sensing core pin 36 to the ECU or ECM (not shown) in unison and proportional with the movement of moveable member 18. A push rod guide 31 with a flange 31a is mounted to the armature 32 and is mounted over the sensing rod 30 along its length between the first rod end 30a and the second rod end 30b. The flange 31a of the guide 31 on the sensing rod 30 is present in the air gap 41 between the solenoid core 33 and the movable armature 32. The sensing rod 30 passes through the solenoid core 33 of the servo-valve 12, the armature 32 within the solenoid core 33, the guide 31 with a flange 31a and the solenoid core 33, the feedback spring 37, the null spring 34, the spool 17 and the servo-valve body 16. An adjustable spring retainer 80 at one end of the null spring 34 maintains the null spring 34 within the solenoid core 33, and spring retainer 35 at the opposite end of the null spring 34 contacts the guide 31, allowing the sensing rod 30 to move freely and independently of the armature 32, push rod guide 31, null spring 34, spring 37 and spool 17 housed in servo-valve body 16.

Figure 3:
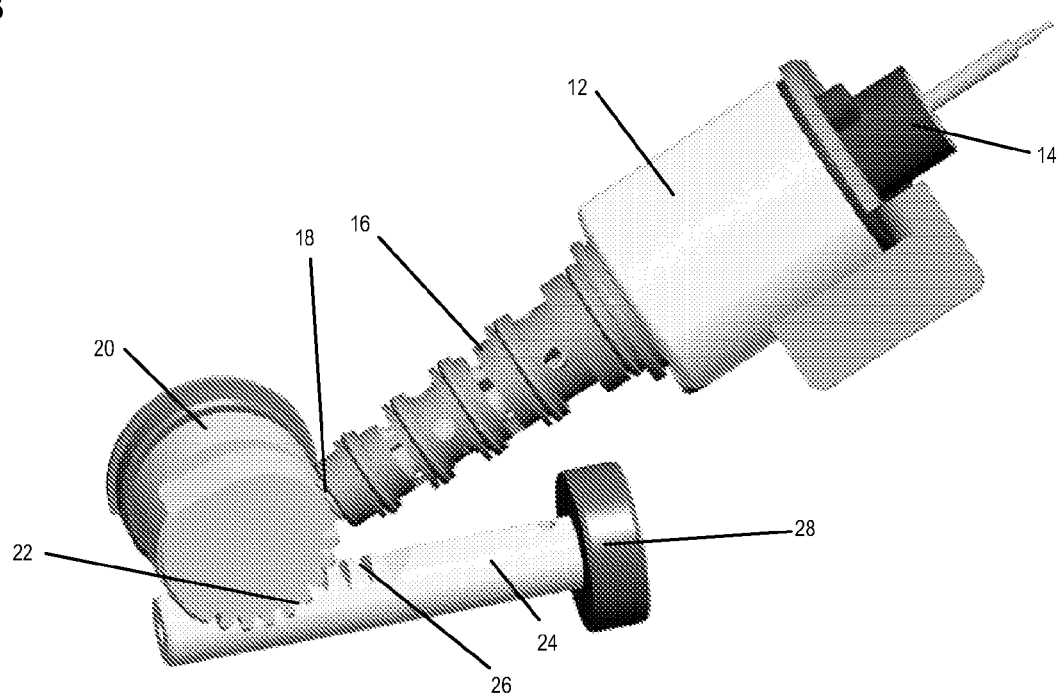
FIG. 3 shows another view of the actuator control valve system shown in FIG. 1.
Figure 4:
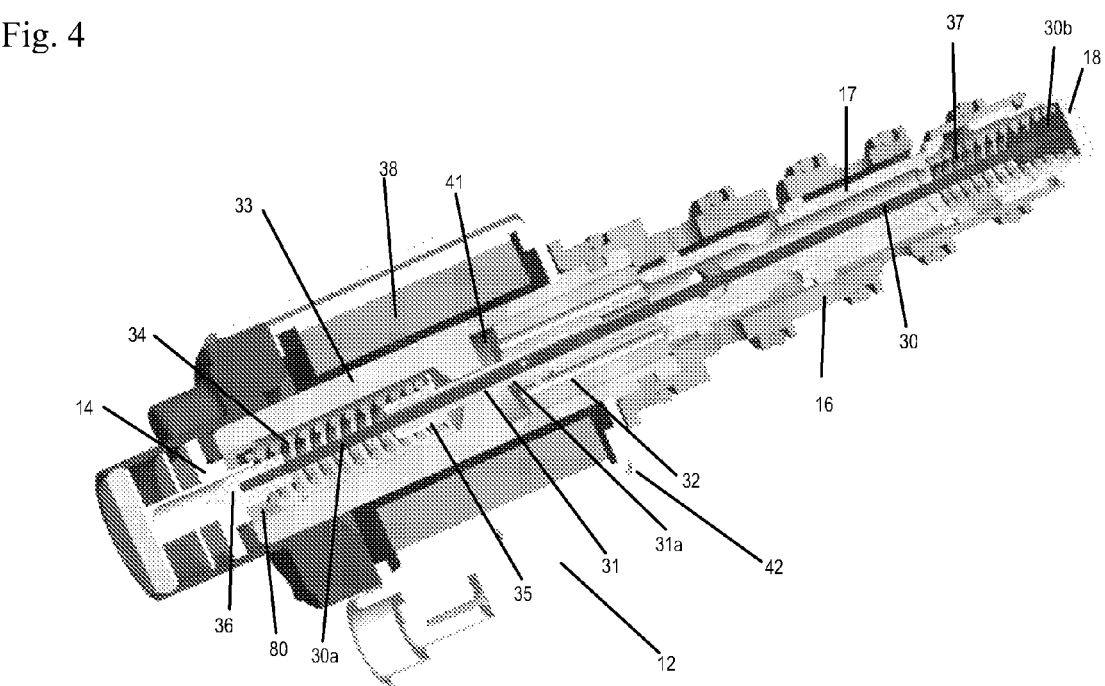
FIG. 4 shows a cross-section of the actuator control valve system shown in FIG. 1.

The actuation of the armature 32 occurs via an increasing electrical signal to the coil(s) 38 from the ECU, which increases the magnetic force in gap 41 proportional to the increasing electrical signal to coil(s) 38. The armature 32, push rod guide 31, spool 17 housed in servo-valve body 16 moves in a first direction decreasing gap 41 between the solenoid core 33 and the movable armature 32 and compresses null spring 34 and extends spring 37. Pressurized fluid is communicated to one side of the piston rack assembly 28 and drained from an opposing side of piston rack assembly 28 via spool 17 in conjunction with servo-valve body 16 through appropriate passage(s) in the servo-actuator 10. The movement of the fluid causes the piston-rack assembly 28 to move in a first direction and the teeth 22 on the pinion 20 and the teeth 26 on the rack 24 mesh as shown in FIG. 3, thereby causing the cam profile of pinion 20 in this example to move or rotate in a first direction, allowing moveable member 18 to move away from spool 17 along its axis, altering the force balance between spring 34 and spring 37. The force balance between spring 34 and spring 37 changes until the spring force balance equals the magnetic force generated in gap 41 between the solenoid core 33 and armature 32 as generated by the electrical commanded signal from the ECU to coil(s) 38.

As motion of the moveable member 18 continues in the first direction, armature 32, push rod guide 31, and the spool 17 housed in servo-valve body 16 also move. The spool 17 blocks fluid from entering and draining the appropriate passages to and from piston rack assembly 28. Since sensing rod 30 is attached to and or mounted against movable member 18 at the second rod end 30b, the sensing rod 30 follows moveable member 18 as it moves along its axis, thereby changing the position of the sensing core pin 36 in reference to the non contact sensor 14.

The change in position in a first direction is communicated to and monitored by the ECU or ECM. The sensor 14 provides electric feedback to the ECU or ECM, as well as on board diagnostic capabilities. Based on the information from the sensor, the ECU or ECM can map the performance of the actuator control valve system to establish an initial performance mapping as well as monitor the performance throughout the life expectancy of the system.

Upon de-actuation of the armature 32 via a decreasing electrical signal to the coil(s) 38, the magnetic force in gap 41 proportional to the decreasing electrical signal to coil(s) 38 is reduced. The armature 32, guide 31, spool 17 housed in servo-valve body 16 moves in a second direction increasing the gap 41 between the solenoid core 33 and the armature 32 and de-compresses spring 34 and compresses spring 37. Pressurized fluid is communicated to one side of the piston rack assembly 28 and drained from the opposing side of piston rack assembly 28 via spool 17 and servo-valve body 16 through appropriate passage(s) in servo-actuator 10. The movement of fluid causes the piston-rack assembly 28 to move in a second direction and the teeth 22 on the pinion 20 and the teeth 26 on the rack 24 mesh as shown in FIG. 3, thereby causing the cam profile of pinion 20 in this example to move/rotate in a second direction allowing moveable member 18 to move towards the spool 17 along its axis, compresses spring 37 and increasing the opposing force of spring 37 to null spring 34. The force balance between spring 34 and spring 37 changes until the spring force equals the magnetic force generated in gap 41 between solenoid core 33 and armature 32 proportional to the electrical commanded signal to the coil(s) 38.

As motion of the moveable member 18 continues in a second direction, the armature 32, guide 31, and spool 17 move. The spool 17 blocks fluid from entering and draining the appropriate passages in actuator 10 to piston rack assembly 28. Since sensing rod 30 is attached to and or mounted to member 18 at the second rod end 30*b*, the sensing rod 30 follows moveable member 18 as it moves along its axis, thereby changing the position of the sensing core pin 36 in reference to the non contact sensor 14 in the second direction. The change in position in a second direction is monitored by the ECU or ECM.

The sensor 14 provides electric feedback to the ECU or ECM, as well as on board diagnostic capabilities. Based on the information from the sensor, the ECU or ECM can map the performance of the actuator control valve system to establish an initial performance mapping as well as monitor the performance throughout the life expectancy of the system.

It should be noted that the positional control of the servo-valve actuator is infinite between the first direction and the second direction proportional to the applied input electrical signal to coil(s) 38. Hence, sensor 14 provides infinite positional feed back to the ECU or ECM of the actuation system.

If the non-contact sensor 14 were to fail, open loop control may be still be obtained by the position feed back spring 37 between spool 17 and the external member 18.

The sensor core 33 profile may be straight, tapered hollow like a tube, concave, convex, profiled-contoured, or parabolic to achieve optimum linearity of the output signal versus position.

The sensor 14 may be added to any mechanical feedback valve within the actuator control valve systems such as a hydraulic, a pneumatic, a rotary or a linear actuated control valve system. The actuator system may be directly or pilot operated by either electrical, hydraulic, pneumatic, or other mechanical means. The actuator control valve system may be part of an but not limited to an EGR system, waste gate control system, cooler bi-pass control system, turbo bi-pass control system, pneumatic flow divider, hydraulic flow divider, variable geometry turbo charger control system, coolant control system, fuel control systems, or cam phasing systems in a combustion or fuel cell engine control management system.

The sensor 14 may be, but is not limited to, an eddy current type, single coil inductive as shown, a LVDT sensor, a Hall Effect sensor, a magnetostrictive position sensor, or a potentiometer.

Figure 5:
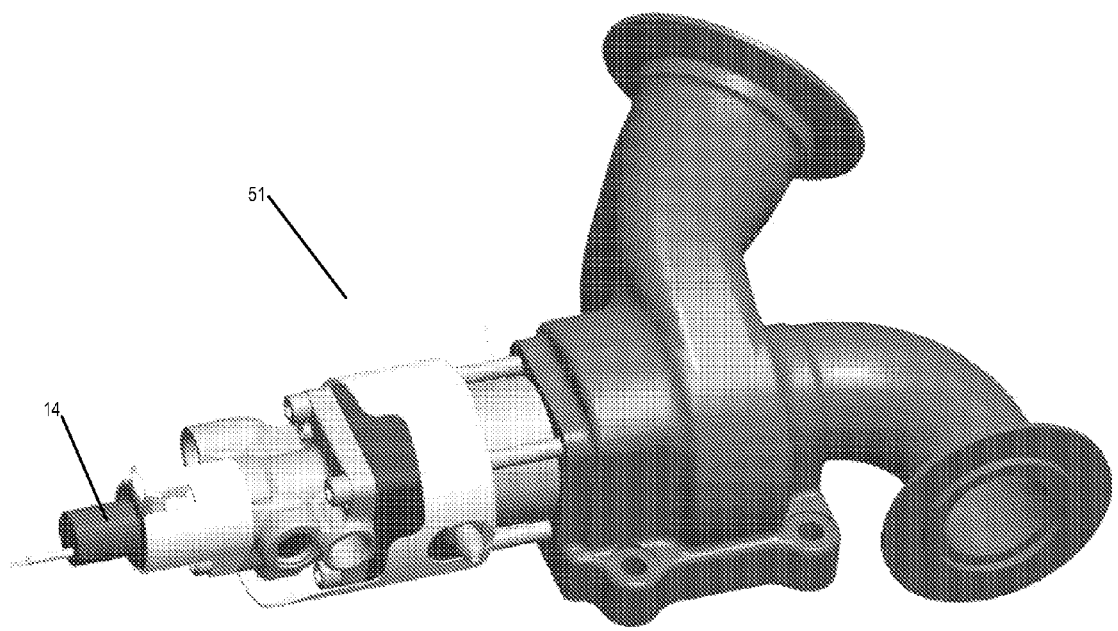
FIG. 5 shows a view of an actuator control valve system in a second embodiment of the present invention.
Figure 6:
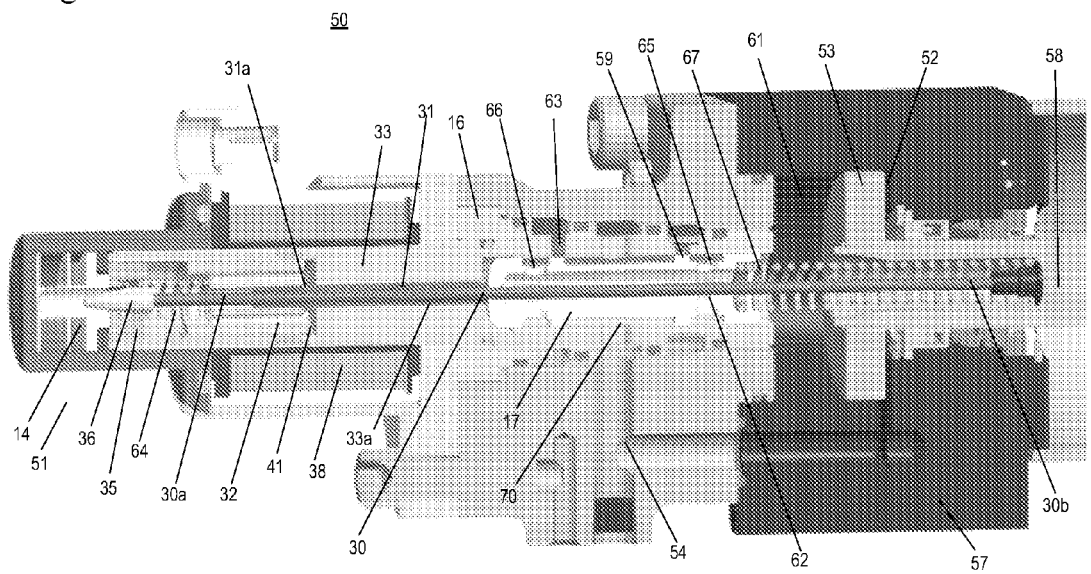
FIG. 6 shows a cross-section of the actuator control valve system shown in FIG. 5.

FIGS. 5-6 show an actuator control valve system in a second embodiment of the present invention. The actuator valve control system 50 includes a servo-actuator 51 with a servo-valve 16 and an integrated sensor 14.

The servo-actuator 51 includes a solenoid core 33 surrounded by coil(s) 38. The solenoid core 33 includes a first spring 64 and a movable armature 32 at one end and a bearing-passage portion 33*a* at an opposite end. An air gap 41 is present between the armature 32 and the solenoid core 33. The servo-actuator 51 also has a sensing rod 30 with a first rod end 30*a* with a sensing core pin 36 and a second rod end 30*b* connectable to a moveable member 58. The sensing core pin 36 is sensed by a non-contact sensor 14 built into or integral with an end of the servo-actuator 51. The non-contact sensor 14 reports the position of the sensing core pin 36 to the ECU or ECM (not shown).

A guide 31 with a flange 31*a* is mounted to the armature 32 which is mounted over sensing rod 30 along its length between the first rod end 30*a* and the second rod end 30*b*. The flange 31*a* of the push rod guide 31 mounted over the sensing rod 30 is present between the armature 32 and the bearing passage portion 33*a* of the solenoid core 33. The sensing rod 30 passes through the solenoid core 33 of the servo-valve 12, the armature 32 within the solenoid core 33, the guide 31 with a flange 31*a* present within the bearing passage portion 33*a* of the solenoid core 33, the first spring 64 and a second spring 67 mounted between a moveable member 58 and the spool 17 of the servo-valve 16. A spring retainer 35 at one end of the spring 64 maintains the first spring 64 within the solenoid core 33 between the end of the solenoid core 33 and the armature 32.

The servo-valve 16 includes a servo-valve actuator housing assembly 57 with a spool 17, and a second spring 67, with one end mounted to the spool 17 and an opposite end mounted to a moveable member 58. The spool 17 is biased in an opposite direction by a first spring 64 through the armature 32 and push rod 31. Attached to the moveable member 58 is a piston 53 within a chamber 52 and 61 between moveable member 58 and the servo-valve actuator housing 57. The spool 17 housed in the servo-valve body 16 directs fluid to and from passages in the servo-valve housing 57 to the chambers 52 and 61 formed between the piston 53 and the servo-valve housing 57.

The actuation of the armature 32 via an increasing electrical signal to coil(s) 38, increases the magnetic force in the gap 41 between armature 32 and solenoid core 33 proportional to the increasing electrical signal to coil(s) 38 and compresses spring 67 and extends spring 64. Pressurized fluid is communicated to one side of the piston 53 via spool 17 through appropriate passages 59, 70, 54 in the servo-actuator housing 57 to chamber 52 and fluid is drained from chamber 61 in servo-actuator assembly 57 through passages 62, 66, 63 formed by spool 17. The movement of fluid causes the piston assembly of piston 53 and moveable member 58 to move in a first direction, compressing spring 67 and increasing the opposing force to spring 64 and magnetic force in gap 41 generated by the electrical signal to coil(s) 38 between solenoid core 33 and armature 32. As the piston assembly moves, the force of spring 67 increases, the spool 17, push rod 31, and armature 32 moves inside servo-valve body 16 and solenoid core 33 until fluid is blocked from entering chamber 52 and draining from chamber 67 by the spool 17. As the piston 53 and moveable member 58 moves, sensor rod 30 follows and the sensor core pin 36 at a first rod end 30a changes position in reference to non contact sensor 14 to reflect the position of the piston 53 and piston member 58.

Upon de-actuation of the armature 32 via a decreasing electrical signal to coil(s) 38, the magnetic force in gap 41 between the armature 32 and the solenoid core 33 decreases proportional to the decreasing electrical signal to coil(s) 38 and compresses spring 64 and extends spring 67. Pressurized fluid is communicated to one side of the piston 53 via spool 17 through appropriate passages 59, 65, 62 in the servo-actuator housing 57 and the spool 17 to chamber 61 and drains fluid from chamber 52 in servo-actuator assembly 57 through passages 54, 70, and 63, causing the piston assembly of the piston 53 and moveable member 58 to move in a second direction. As the piston assembly moves and decreases the opposing force of spring 67, the spool 17, push rod 31, and armature 32 moves inside servo-valve body 16 and solenoid core 33 until fluid is blocked from entering chamber 61 and exiting chamber 52 by the spool 17. As the piston assembly of piston 53 and moveable member 58 moves, sensing rod 30 follows and the sensor core pin 36 at the first rod end 30a changes position in reference to the non contact sensor 14 to reflect the position of the piston 53 and moveable member 58.

The sensor 14 provides electric feedback to the ECU or ECM, as well as on board diagnostic capabilities. Based on the information from the sensor, the ECU or ECM can map the performance of the actuator control valve system to establish an initial performance mapping as well as monitor the performance throughout the life expectancy of the system.

The sensor core 33 profile may straight, tapered, concave, hollow like tube, convex, profiled-contoured, or parabolic to achieve optimum linearity of the output signal versus position.

The sensor 14 may be added to any mechanical feedback valve within the actuator control valve systems such as a hydraulic, a pneumatic, a rotary or a linear actuated control valve system. The actuator system may be directly or pilot operated by either electrical, hydraulic, pneumatic, or other mechanical means. The actuator control valve system may be part of, but not limited to an EGR system, waste gate control system, cooler bi-pass control system, turbo bi-pass control system, pneumatic flow divider, hydraulic flow divider, variable geometry turbo charger control system, coolant control system, fuel control systems, or cam phasing systems in a combustion or fuel cell engine control management system.

The sensor 14 may be, but is not limited to, an eddy current type, single coil inductive as shown, a LVDT sensor, a Hall Effect sensor, magnetostrictive position sensor or a potentiometer.

It should be noted that the positional control of the servo-valve actuator is infinite between the first direction and the second direction proportional to the applied input electrical signal to coil(s) 38. Hence, sensor 14 provides infinite positional feed back to the ECU or ECM of the actuation system.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An actuator control system including a servo-actuator comprising:
    a solenoid comprising:
        at least one coil;
        a solenoid core within the at least one coil;
        a moveable armature actuated by electrical signals in the coil;
    a servo valve adjacent to the solenoid, comprising:
        a spool body;
        a spool within the spool body, coupled to the movable armature such that movement of the movable armature moves the spool;
    a moveable member adjacent to the servo valve, on an opposite end of the servo valve from the solenoid;
    a non-contact sensor integral with the servo-actuator, positioned adjacent to the solenoid on an opposite end of the solenoid from the servo valve;
    a feedback spring exerting a bias force biasing the spool and movable armature in a first direction, coupled on a first end to the spool and on a second end to the movable member, such that movement of the movable member alters the bias force of the feedback spring;
    a null spring coupled to the movable armature, biasing the spool and the movable armature in a second direction opposite the first direction; and
    a sensor rod having a first end adjacent to the non-contact sensor, a second end coupled to the movable member, and a length extending between the first end and the second end, passing through the solenoid, the spool, the feedback spring and the null spring;
    the first end of the sensor rod having a sensing core pin for sensing by the non-contact sensor, such that a position of the movable member is reported by the non-contact sensor by sensing a position of the sensing core pin.

2. The system of claim 1, further comprising a piston hydraulically coupled to and controlled by the servo valve.

3. The system of claim 2, in which the piston is coupled to the moveable member, such that movement of the piston moves the position of the movable member and alters the bias force of the feedback spring, the position of the movable member being reported by the non-contact sensor.

4. The system of claim 3, wherein the servo-valve is hydraulically coupled to the piston through passages through the spool body of the servo-valve.

5. The system of claim 1, wherein the profile of the sensing core pin is straight, tapered, concave, convex, a hollow tube, profiled-contoured, or parabolic.

6. The system of claim 1, wherein the non-contact sensor is an eddy current sensor, a LVDT sensor, a Hall Effect sensor, a coil inductive sensor, magnetostrictive position sensor, or a potentiometer.

7. The system of claim 3, in which the system further comprises:
    a piston rack coupled to the piston having a plurality of teeth; and
    a pinion having a plurality of teeth meshing with the teeth of the piston rack, and a cam profile in contact with the movable member;
    such that movement of the piston rack rotates the pinion, and the cam profile of the pinion moves the position of the movable member.

8. The system of claim 3, in which the servo actuator further comprises a piston chamber between the servo valve and the movable member, the piston being movable housed in the piston chamber, the sensor rod passing through a center of the piston, and the movable member is coupled directly to an end of the piston.

9. The system of claim 3, in which the non-contact sensor is coupled to an ECU, and a selected position of the servo-valve actuator is set by the ECU by sensing the position of the movable member using the non-contact sensor.

* * * * *

UNITED STATES PATENT AND TRADEMARK OFFICE
CERTIFICATE OF CORRECTION

PATENT NO.        : 8,672,291 B2          Page 1 of 1
APPLICATION NO.   : 12/988835
DATED             : March 18, 2014
INVENTOR(S)       : Jeff Tyler It is certified that error appears in the above-identified patent and that said Letters Patent is hereby corrected as shown below:

On the Title Page, Item (54) and in the Specification, Column 1, Lines 1-2: replace "CONTOL," with "CONTROL"

Signed and Sealed this
First Day of December, 2015

Michelle K. Lee
*Director of the United States Patent and Trademark Office*